March 31, 1964 J. MAISLINGER 3,127,561
METER MECHANISM OF THE ECCENTRICALLY PIVOTED COIL TYPE HAVING
HIGH TORQUE AND THE MAGNETIC FLUX RETURN COMPLETELY
SURROUNDING THE METER MOVEMENT
Filed March 31, 1961 3 Sheets-Sheet 1

JOHANN MAISLINGER
INVENTOR

BY *Peck + Peck*

ATTORNEYS

INVENTOR:
JOHANN MAISLINGER

BY Prechz + Pecks

ATTORNEYS

JOHANN MAISLINGER
INVENTOR 3,127,561
METER MECHANISM OF THE ECCENTRICALLY
PIVOTED COIL TYPE HAVING HIGH TORQUE
AND THE MAGNETIC FLUX RETURN COM-
PLETELY SURROUNDING THE METER MOVE-
MENT
Johann Maislinger, 14 Bayshore Drive, Milford, Conn.
Filed Mar. 31, 1961, Ser. No. 99,794
3 Claims. (Cl. 324—151)

My invention relates to certain improvements in and relating to meter mechanism of the eccentrically pivoted coil type having high torque and the magnetic flux return completely surrounding the meter movement, and specifically to such mechanisms of the D'Arsonval types; and the nature and objects of the invention will be readily recognized and understood by those skilled in the arts to which the invention relates from the following detailed description and explanation of the accompanying drawings illustrating possible embodiments or mechanical and electrical expressions of the invention from among various other embodiments, expressions, forms, combinations and constructions, of which the invention is capable within the broad spirit and scope thereof as defined by the claims hereto appended.

This application was filed as a continuation-in-part of my then copending but now abandoned application Serial No. 843,983, filed October 2, 1959, for High Torque Meter Mechanism.

Many applications of electrical measuring meters or instruments essentially require that the instrument be of very small or so-called "miniature" size, yet notwithstanding the severe limitations imposed by such small size, the instrument must nevertheless be capable of developing high torque with low power requirements. And further, it is also highly desirable for efficiency of performance that the instrument have a high torque-to-weight ratio, that is, the torque developed by the meter mechanism of the instrument should be high with the weight of the complete moving component of the mechanism low. The power requirements for efficient and reliable precision operation of such an instrument, even though the instrument must be capable of developing relatively high torque, should still be sufficiently low to eliminate any necessity for amplification of the input signals to the instrument. Electrical measuring instruments having high torque are much more reliable and precise in their functioning under all conditions of operation and use, including the most severe conditions to which the instrument may be subjected, and this is particularly true when the instruments must operate relatively long and heavy pointers. It follows, therefore, that in an electrical measuring meter or instrument having the factors of high torque and low power requirements with low weight of the complete moving component of the instrument, which give the instrument reliability and efficiency of operation, the ratio of torque-to-power and of torque-to-weight of the moving component should always be as high as possible for a given size of instrument.

A meter mechanism of my invention is preferably of the D'Arsonval type. This type of meter mechanism is basically characterized by a permanent core magnet combined with a movable coil to which a pointer is attached with such coil having at least one side thereof moving through an air gap in which a magnetic field is generated and set up by the permanent magnet. Meter mechanisms of the D'Arsonval type having but a single air gap in which the coil moves are capable of developing higher torque than such types of meter mechanisms having dual or multiple air gaps. The foregoing is particularly true when the pivot point for the moving coil of the mechanism is located beyond or outside of the permanent core magnet and its return path structure for the purpose of obtaining a large radius for the moving coil. The torque developed in such a meter mechanism is the product of the force acting on the movable coil times the radius, that is to say, times the distance from the side of the movable coil in the air gap to the pivot point for the coil. Hence, a greater torque may be developed where the pivot point for the moving coil is located outside of the permanent magnet and return path structure at the pole end thereof opposite the pole end at which the air gap is located. With a meter mechanism of the D'Arsonval or permanent magnet type of a given size, the greater the amount of magnetic material which can be provided by the magnet of the mechanism, the higher the concentration of flux will be in the air gap and, hence, the greater the torque that will be developed by the mechanism for a given power input. As the power requirement for such a meter mechanism is essentially dependent upon the resistance offered by the movable coil and the total weight of the complete moving component of which said coil forms a part, the smaller the coil can be made to reduce the weight thereof and to reduce the total length of coil wire, without reducing the maximum number of turns possible for the coil, the lower the resistance will be and the lower the power requirement, so that reduction in resistance and weight and resulting reduction in the power requirements can be effected without reducing the torque developed from the coil.

It is a general object of my invention to provide a meter mechanism of the D'Arsonval or permanent core magnet type which may be of small or miniature instrument size, yet will be capable of developing high torque on low power and which will have a high torque-to-weight ratio.

It is a further object to provide such a meter mechanism in which a maximum of magnetic material, that is to say, a larger permanent core magnet, may be utilized to thereby obtain more flux in higher concentration in the air gap.

A further object is to provide a design and construction of meter mechanism in which a longer permanent core magnet may be utilized to obtain an increase in magnetic material but without such a substantial increase in the overall length dimension of the mechanism as to prevent installation of a meter unit incorporating such mechanism in the space normally available for such types of meter units.

Another object is to provide a meter mechanism of the permanent core magnet type not only capable of developing high torque on low power with a high torque-to-weight ratio, but also having effective damping of the mechanism and resulting precision of performance.

Another object is to provide such a meter mechanism of a design and construction such that the movable coil may be of relatively small or reduced size to thereby reduce the length of coil wire necessary while maintaining a maximum number of turns therefor so as to reduce the resistance of the coil without reducing its torque developing potential, as well as to reduce the weight of the moving component of which the coil forms a part and thereby substantially contribute to the desired high torque-to-weight ratio of the meter mechanism.

A further object is to provide such a mechanism which, while not limited to, is particularly adapted for instruments having relatively small angles of deflection, say, angles of deflection in the range up to approximately 60°.

A further object is to provide a meter mechanism having a permanent magnet and return path structure providing a single air gap at one end or pole thereof in which a coil is movably mounted with the coil pivoted at a location outside of the permanent magnet and return path structure at the end or pole thereof opposite the air gap with one side of the coil located in the air gap, while the opposite side of the coil is located at the outside of the return path structure that is located at the air gap.

A further object is to provide such a high torque meter mechanism of the D'Arsonval type in which the side of the movable coil in the air gap is the side of the coil that is the closest to the pivot of the movable coil.

Another object is to provide a design of meter mechanism in which a cover over and protecting one end thereof is eliminated and the space occupied thereby utilized for increasing the length of the permanent core magnet.

A further object is to provide a meter mechanism having the foregoing characteristics and features which is of simplified structural and electrical design that may be manufactured and assembled at relatively low cost.

With the foregoing and various other features, objects and results in view which will be readily recognized and understood by those familiar with the arts involved, my invention consists in certain novel features in design, construction and combination of parts and components, as will be more fully set forth and specified hereinafter.

Referring to the accompanying drawings in which similar reference characters refer to corresponding parts throughout the several figures thereof:

Figure 1:
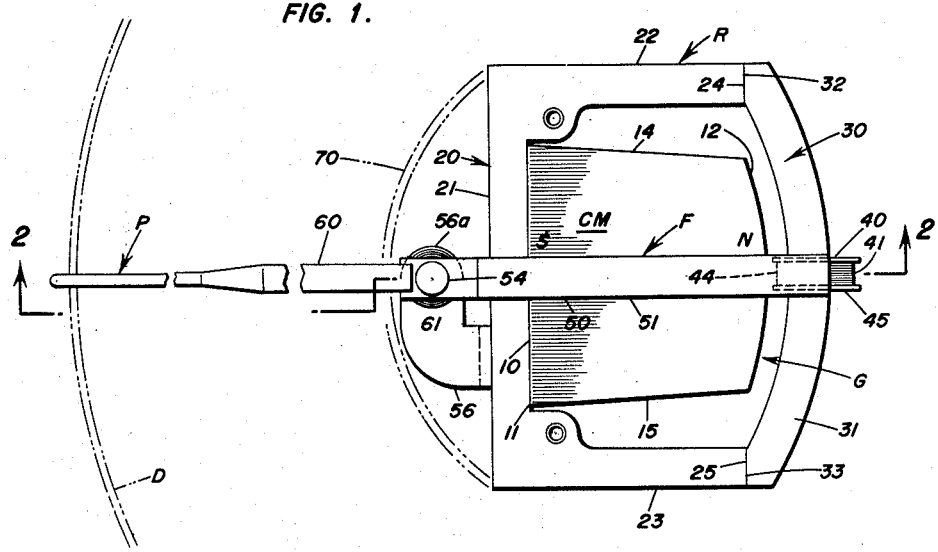
FIG. 1 is a view in top plan, more or less schematic, of one form of meter mechanism of my invention.

One example of a high torque meter mechanism incorporating the principles and features of my invention is more or less schematically illustrated in the accompanying drawings. In this particular example the mechanism includes essentially a permanent core magnet CM of generally rectangular block form providing at opposite ends thereof the opposite poles N and S, respectively; the flux return flow path structure R; the moving coil system comprised solely of the movable coil C mounted on and carried by the pivotally mounted swinging frame F; and the air gap G formed between the N pole end of magnet CM and the adjacent portion of the return path structure R in which one side of the movable coil C is received. While in the example hereof the N pole end of magnet CM is at the air gap G, it is to be understood that, if desired, the S pole end may be so located with the N pole located at the opposite end of the magnet.

The core magnet CM may provide at the S pole or base end 10 thereof the inner side, flat planar surface 11. At the opposite, N pole end of the magnet CM in the specific example hereof, the wall thereof is formed on a radius transversely of the magnet block to form the arcuate, convex surface 12 thereacross. The N pole end of the magnet CM is of less width than the S pole or base end 10 thereof and the opposite sides 14 and 15 of the magnet block are provided by planar surfaces which taper or incline from the base 10 to the transversely curved or arcuate surface 12 constituting the N pole end of the magnet. The opposite sides of the magnet CM at the opposite ends of the side walls 14 and 15 are formed to provide the generally planar and parallel surfaces 16 and 17. (See FIG. 2.) Thus this permanent core magnet CM is of solid and unbroken block form and in accordance with my invention for any given mechanism has as great a length along the magnetic axis thereof between the pole ends N and S as possible in order to obtain a high flux density in the air gap G.

The flux return path structure R is comprised of the section identified generally by the reference character 20, and the section identified generally by the reference character 30. The section 30 is removably attached to the section 20 in assembled position therewith to form the complete and unitary flux return path structure. The section 20 is formed of the base plate 21 of plate form having the opposite side wall forming plates 22 and 23 which extend from and along the opposite side edges of the base plate 21. In the specific example hereof the side wall forming plates 22 and 23 extend in parallelism at one side of base plate 21 and in planes generally normal to the plane of base plate 21. The invention is not, however, limited to the side wall forming plates being either parallel or normal to base plate 21, as if desired they may extend in planes at an angle to the base plate. The section 30 of the return path structure R is formed by an arcuate shaped or curved plate 31 which has along its opposite side edges the seating or engaging surfaces 32 and 33 adapted to be seated and engaged on the outer edge surfaces 24 and 25, respectively, of the side wall plates 22 and 23 of the section 20 of the return path structure in assembled position of these sections. The section 30 is detachably mounted and fixed on the section 20 by any suitable fastening or securing means (not shown) and is positioned thereon with the convex side extending outwardly, as will be clear by reference to FIG. 1. The width of the plates 21, 22, 23 and 30 making up the structure R is substantially the same as the width of the magnet CM at the sides thereof opposite and surrounded by the structure R, as clearly shown by FIG. 2 of the drawings. However, the invention is not limited in all respects to such dimensional relationship between the magnet CM and the structure R.

The core magnet CM and the flux return path structure R are assembled in magnetic connection and association with the magnet CM mounted and located within and surrounded by the return structure R in such a manner as to form the air gap G between the N pole end of the magnet and the adjacently located section 30 of the return path structure. In this particular example the magnet CM is mounted within the structure R with the planar surface 11 of the base 10 of the magnet seated on and engaged against the base plate 21 between the side walls 22 and 23 of the return structure R. The dimensions of the core magnet CM are such that the base 10 has a length substantially equal to the width of the surface of the base plate 21 of structure R between the facing inner sides of the side walls 22 and 23 so that the pole end S of the magnet is located at and in magnetic connection with the base plate 21 of structure R. The air gap G is provided between the curved or arcuate surface 12 of the N pole end of the magnet and the facing inner, convex side of the plate 31 of the return flow structure. The radius of curvature on which the arcuate plate 31 is formed is greater than the radius of curvature on which the arcuate surface 12 of the N pole end of the magnet is formed, both curvatures having the same center point. Thus the air gap G is of arcuate shape along and between the N pole and the arcuate plate 31 with the air gap consequently being of constant width throughout its width across and its length between magnet CM and the arcuate plate section 31 of the flux return path structure R. The return path structure R may be formed of any suitable permeable material, such for example, as soft iron. Thus, as will be understood by those skilled in this art, the combination of magnet CM and return path structure R develops in the air gap G a flux concentration or magnetic field.

The dimensions of the core magnet CM are such that the magnet substantially occupies the entire space within and surrounded by the flux return path structure R. In this manner, for a given size of instrument a maximum of magnetic material is obtained with the resulting higher concentration of flux in the air gap G. The magnet CM at the base 10 thereof is of substantially the full width of the space between the side wall plates 22 and 23 of the return path structure R and this base width is reduced to a minimum throughout the length of the magnet along the magnetic axis thereof between the S pole end and the N pole end due to the small angle of taper of the magnet sides 14 and 15. Thus a maximum size of magnet is obtained for any given size of meter mechanism. The size of the magnet CM is limited only by the fact that excessive stray flux will result if the sides 14 and 15 thereof come too close to the return path structure R.

Figure 2:
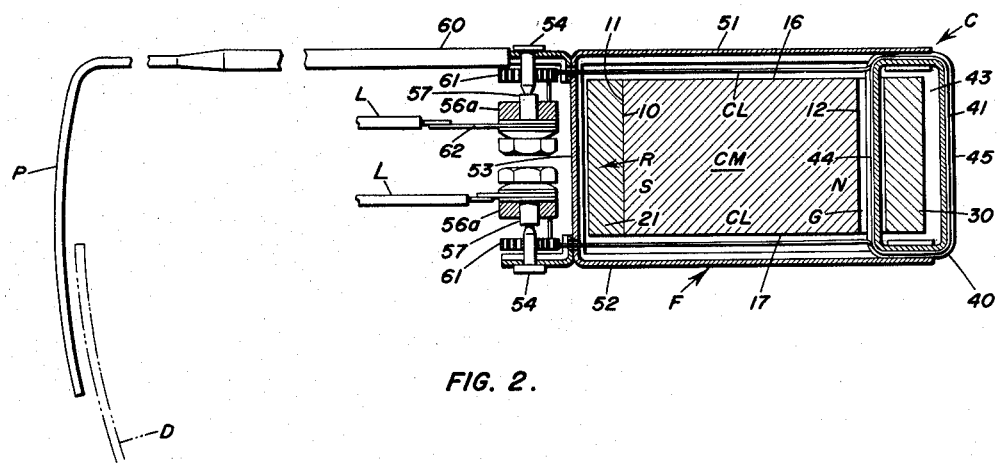
FIG. 2 is a vertical sectional view taken as on the line 2—2 of FIG. 1.

In accordance with my invention I have devised and provided a moving coil system that is comprised solely by the movable coil C of the meter mechanism as of a generally annular and open center type which in this example is of rectangular form having a transverse or width dimension substantially reduced relative to the longitudinal or length dimension of the coil, as will be clear by reference to FIG. 2 of the drawing. This coil C is formed of a spool or holder 40 in the form of an open rectangular frame which defines and gives to the coil the relative width and length dimensions, as referred to above. The rectangular spool or frame 40 of the coil C provides the opening 43 therethrough which receives the section 30 of the return path structure when the coil C is in its assembled relation in the meter mechanism. The coil C is formed on the spool or holder 40 in the usual manner by winding the wire 41 therearound to provide the desired number of turns thereon making up the particular coil for a given meter mechanism. The rectangular opening 43 through the coil provided by the spool or holder 40 has a width and length greater than the thickness and width of the section 30 of the return path structure R so that the section 30 may be received therein and extending therethrough with substantial clearance completely therearound in all locations of the coil in the air gap G. The coil C is mounted on and over the arcuate plate section 31 of the return path structure R with section 31 extending through opening 43 and is thus swingable or movable thereover and therealong without contact or engagement therewith in view of the clearance with section 31. Thus mounted and positioned, the longitudinal side 44 of coil C is located in and extends through the air gap G between the arcuate surface 12 at the N pole end of magnet CM and the arcuate inner surface of the plate section 31, while the opposite longitudinal side 45 of the coil is located and positioned across and over the outer, convex side of the arcuate plate 31, that is completely outside of the magnet CM and the return path structure R.

In order to thus position and movably mount the coil C that alone provides the moving coil system, I provide a lightweight frame 50 comprised of the spaced parallel arms 51 and 52 which extend over and across and which are spaced outwardly from the opposite sides 16 and 17 of the core magnet CM with the forward free ends of these frame arms extending over and across the air gap G and having connected and secured therebetween the coil spool or holder 40 so that the coil C is thus secured between and carried by these frame arms. The frame arms 51 and 52 at the ends thereof opposite the coil C extend a distance outwardly beyond the S pole end of magnet CM and the base plate 21 of the return path structure R and are connected and joined by a rigid cross or end member 53 which is located in position at the outer side of base plate 10 of structure R. There is thus provided a relatively rigid, lightweight rectangular frame comprised of the opposite side arms 51 and 52 connected at their opposite ends by the coil C and the cross or end member 53, respectively, as shown in FIG. 2.

This swinging frame 50 is, in accordance with my invention, pivotally mounted at a location on the projection of the magnetic axis of the magnet CM spaced from the S pole end of the magnet, by the opposite, axially aligned pivot pins 54 that are mounted in and carried by spaced and parallel extensions of the opposite frame arms 51 and 52. Bearing supports 56 are provided fixed to or forming an integral part of base plate 10 of return path structure R. The bearing supports 56 are positioned at one side of the longitudinal axis of the magnet CM and its return path structure R and extend outwardly from base plate 10 of structure R in planes substantially parallel with the sides 16 and 17 of magnet CM, as will be clear by reference to FIG. 2. Each of the bearing supports 56 includes an inwardly extending arm 56a at the outer end thereof generally parallel with and spaced from base plate 10 of structure R so as to form a space for receiving and in which the end member 53 of the frame 50 is located for angular displacement. So called jewel bearing screws 57 are suitably mounted and fixed in and extend transversely through the outer ends of the arms 56a of bearing supports 56 in axial alignment transversely relative to frame arms 51 and 52. The pivot pins 54 carried by the opposite frame arms 51 and 52 have bearing engagement and rotatable support on and against the adjacent ends, respectively, of the jewel bearing screws 57. Thus the lightweight frame 50 with the coil C mounted at one end thereof is pivoted for minimum friction swinging movement in either direction around the pivot pins 54 as an axis for movement of the coil over and along the arcuate plate section 31 of the return path structure R to move the coil side 44 through the air gap G and the magnetic flux concentration in that gap developed and supplied by the core magnet CM and the return path structure R. In such mounted arrangement and assembly the cross or end member 53 of the frame 50 is located in and movable freely through the space provided between the arms 56a of the bearings 56 and the outer side of the base plate 21 of the return structure R, thus providing a very compact and mechanically efficient arrangement. Attention is directed to the fact that in certain applications of the invention it may be found preferable to interchange the locations of the pivots and the jewels, that is, the pivots may be mounted on arms 56a and the jewels on the frame 50.

One of the pivoted frame arms, in this example the arm 51, of the coil mounting frame F, has attached and rigidly fixed thereto in axial alignment therewith the usual indicator or pointer arm 60 which, as is well understood in the art, carries a pointer P at its outer end that in an assembly of the meter mechanism of the instrument is located at the instrument dial or scale D indicated by dotted lines in the drawings, for movement thereover as the frame is swung by the torque actuating forces generated when the coil C is energized. The restoring force for the assembly of the pivoted frame F and the coil C carried thereby may be provided as indicated in the example mechanism by the usual spiral springs 61 engaged between the arms 51 and 52 of the frame F and the fixed bearing supports 56, respectively. As will be recognized by those familiar with this art, it is also possible, and my invention and this disclosure includes the use of the so-called "taut band" suspension method (not shown) which provides both pivoting and restoring force simultaneously. The usual or any desired so-called zero adjusting mechanism may be provided for adjusting the position of the pivot frame, coil and pointer assembly to seat the pointer relative to the dial zero mark, as indicated and represented by the zero adjusting arm 62 shown in FIG. 2 of the drawings.

The pivotal coil mounting frame F is of simple, lightweight construction, while the coil C in this example form of my invention reduces substantially the length of wire 41 in the coil C and thereby substantially reduces the resistance of the coil and therefore the power required for operation of the meter mechanism, while, however, placing no limitation on the coil requiring any reduction in the number of turns which may be wound on the coil spool or support 40. In other words, by reducing the relative size of the coil for any given size of instrument, unnecessary wire length and the resistance thereof has been reduced, yet the number of turns of wire which may be wound on the coil and which contribute to the increased torque developed therefrom has been in no way limited or restricted. In addition, the reduction in the size of the coil reduces the weight thereof which, together with the light frame F on which the coil is mounted reduces the weight of the complete moving component C, F and 60 to thereby contribute to the high torque-to-weight ratio attained by a meter mechanism of this form of my invention. It is to be further noted that by locating the pivotal mounting point for the assembly of the frame F and its coil C beyond the magnet and return path structure at the pole end of the magnet opposite the pole end at which the air gap is located, a large radius is thereby obtained. As the torque is the product of the forces acting on the coil times the distance of the side of the coil in the air gap to the pivot point, it follows that high torque will be obtained as a result of such relative positioning. Thus a meter mechanism embodying my invention is of a design that is particularly effective and efficient for instruments of small or miniature size, especially where such instruments are required to operate relatively heavy pointers through small angles of deflection.

An important characteristic of a high torque meter mechanism of the invention, is the combination of the meter components by which the coil is positioned with one side thereof in the air gap and the opposite side at the outside of the core magnet and return path structure at the pole end of the magnet opposite the pole end of the latter at which the pivot point about which the coil is swung is located. In other words, this characteristic requires that the side of the coil in the air gap of the meter mechanism be the side of the coil that is always located nearest or closest to the pivot point about which the coil is swung. This characteristic contributes essentially to the reduction possible in the size of the coil and the resulting reduction in resistance and power requirements by the elimination of unnecessary wire length in the coil, as well as contributing by a reduction in the weight of the coil to the desired high torque-to-weight ratio.

With the meter mechanism of my invention as expressed by the selected example of FIGS. 1 and 2 hereof, it will be understood that the coil C is connected into a signal receiving or power circuit in the usual or conventional manner familiar in this art and therefore it is not believed necessary herein to disclose such circuit. When the coil C is energized, due to the coil side 44 located in the magnet field or flux concentration in the air gap G, the coil will be deflected through an angle of deflection in accordance with the magnitude of the energizing current. Due to the extremely simple mechanical structure and assembly of the components making up the mechanism, it can be readily dimensioned and assembled for the small or miniature size electrical measuring instruments. The assembly and disassembly of the meter mechanism is facilitated by the formation of the return flow path structure R of the sections 20 and 30, with the latter section which receives thereon the movable coil C being detachably connected to the section 20. Such detachable section formation of the return path structure R makes it easy to not only position the coil C on the section 30, as well as to remove the coil from that section, but also facilitates the assembly of the core magnet CM, frame 50 and section 20 of the return path structure in their proper assembled relationship.

The input leads L for the coil energizing circuit are shown in FIG. 2, together with the coil leads CL connected therewith and leading to and connected into the coil C, as will be readily understood by those skilled in this art.

It is to be noted that due to the design and mounting of the bearing supports 56, the end member 53 of the coil supporting frame 50 is located for displacement between the bearing supports and the base plate 21 of section 20 of the return path structure R to provide a more compact and efficient arrangement.

In order to enclose and protect the assembly comprised of the bearing supports 50, the frame end member 53, the spiral springs 61, zero adjusting arm 62, and the input leads L, it is desirable to provide a suitable plastic cover supported from the plate member 21 of the return flow structure R. Such a plastic cover 70 is indicated in dotted lines in FIG. 1. The cover 70 has substantially the width of the plate member 21 and is bowed or arched outwardly therefrom and preferably extends over and across the over-all thickness of the assembled meter mechanism.

Figure 3:
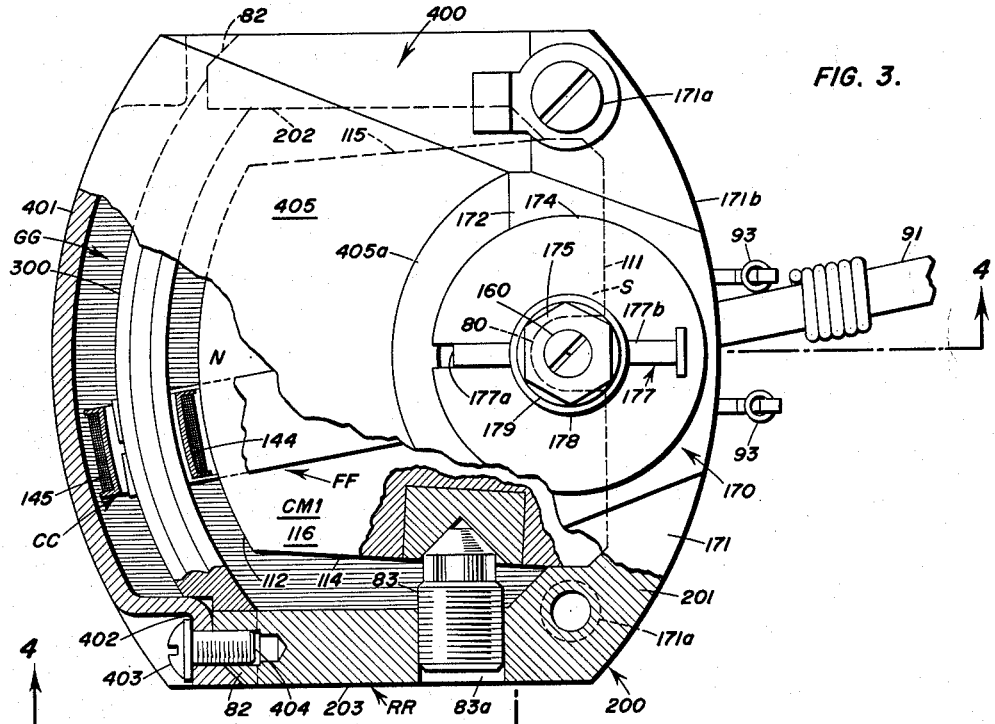
FIG. 3 is a top plan view of an instrument made up from and incorporating another form of meter mechanism of my invention, a portion of the enclosing cover of the instrument being broken away to show the moving coil, pole piece and air gap.
Figure 4:
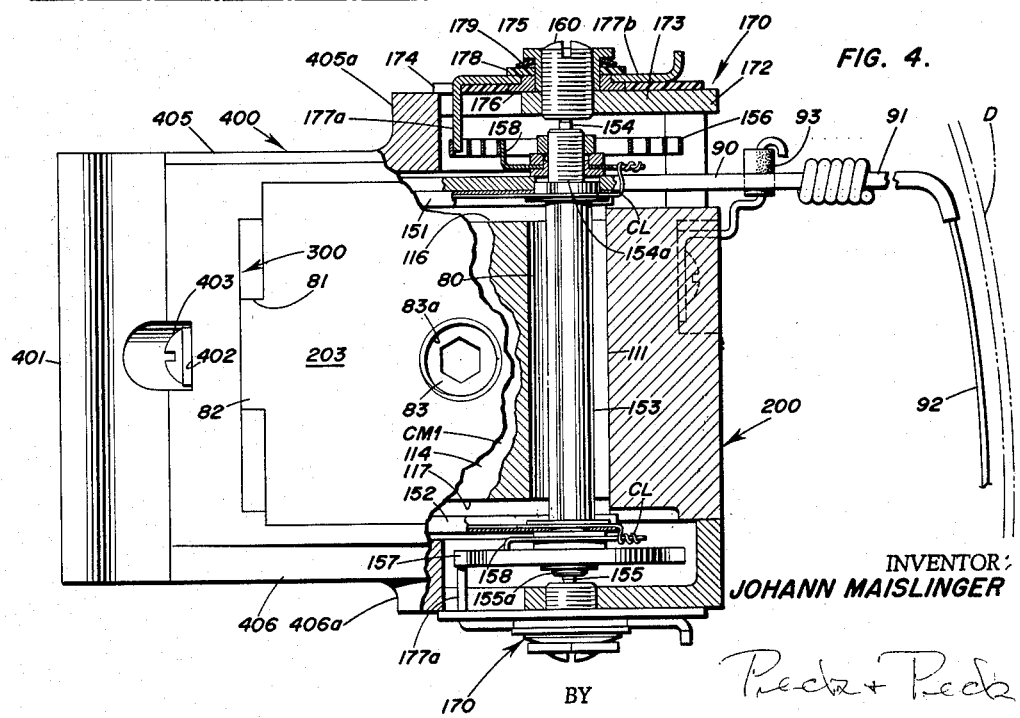
FIG. 4 is a vertical, sectional view taken as on the line 4—4 of FIG. 3.
Figure 5:
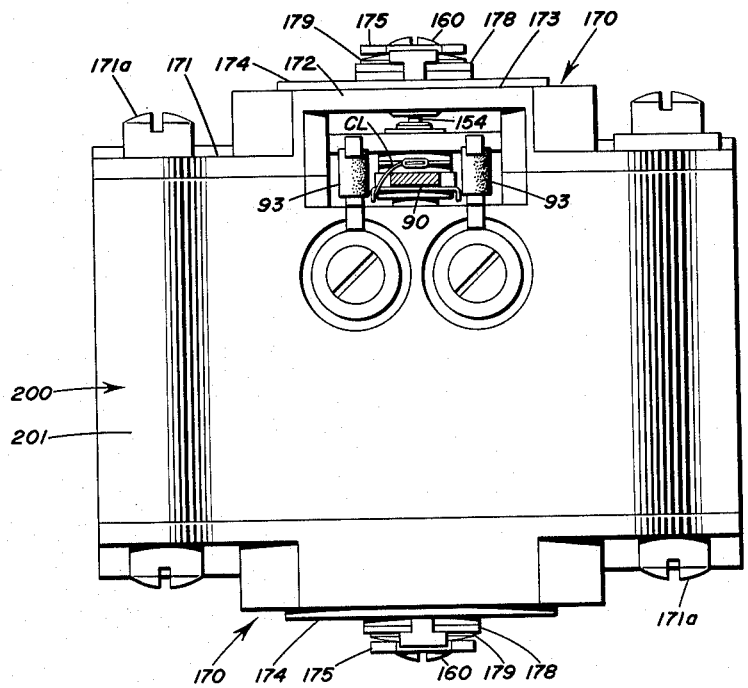
FIG. 5 is a view in end elevation taken at the pointer end of the instrument.

In another and preferred form of meter mechanism of my invention as shown in FIGS. 3, 4 and 5 of the accompanying drawings, the strength of the permanent core magnet is appreciably increased by increasing its length without, however, increasing the over-all length dimension and size of a meter mechanism to an extent to prevent its mounting and installation in the space usually available for the mounting of a meter unit of such a type. By thus increasing the strength of the magnet, the flux density at the air gap is appreciably increased so that the meter mechanism develops a greater torque with corresponding substantial increases in the critical torque-to-weight and torque-to-power ratios. And further, by the design and arrangement of the form of meter mechanism of the invention, as exemplified in FIGS. 3, 4 and 5, the usually required plastic front cover, such as the cover 70 of FIG. 1, may be eliminated with the front wall of the yoke member functioning not only as a front cover, but also making it possible to thereby utilize a magnet of greater length and resulting increased strength.

In the preferred form of meter mechanism of my invention, as illustrated in FIGS. 3, 4 and 5, there is included basically the corresponding components and the functioning thereof the form of meter mechanism of FIGS. 1 and 2, namely: a permanent core magnet CM1 of generally rectangular block form providing at the opposite ends thereof the opposite poles N and S, respectively; the flux return flow path structure RR; the moving coil system comprised solely by the coil CC mounted on and carried by the pivotally mounted swinging frame FF; and the air gap GG formed between the N pole end of the magnet CM1 and the adjacent end portion of the flux return flow structure RR in which one side of the movable coil CC is received. In this example meter mechanism the N pole end of the magnet CM1 is at the air gap GG. However, if desired, the S pole end of the magnet CM1 may be located at the air gap GG with the N pole being then located at the opposite end of the magnet.

The core magnet CM1 in this form of meter mechanism of the invention may provide at the S pole or base end thereof the flat planar surface 111 into the center of which along the normal to the magnetic axis of the magnet there is provided a cut-out, slot or groove forming a re-entrant portion 80 which extends completely through the magnet for a purpose to be hereinafter described. At the opposite, N pole end of the magnet CM1 the wall thereof is formed on a radius transversely of the magnet block to form the arcuate, concave surface 112 thereacross. The N pole end of the magnet CM1 is of less width than the S pole or base end 111 thereof and the opposite sides 114 and 115 of the magnet block are provided by planar surfaces which taper or incline from the base 110 to the transversely curved or arcuate surface 112 constituting the N pole end of the magnet. The opposite, upper and lower sides of the magnet CM are formed to provide the generally planar and parallel surfaces 116 and 117, respectively.

In accordance with his form of my invention, as will be developed hereinafter, the magnet CM1 has a greater length along the magnetic axis thereof between the pole ends N and S, than the corresponding length dimension of the magnet CM of the form of the meter mechanism of the invention as disclosed in FIGS. 1 and 2. This greater magnet length is made possible by the design and construction of the flux return flow path structure RR and the arrangement of the mounting for the moving coil assembly with the elimination of the usual structure projecting forwardly from the return flow path structure with the cover therefor.

In the example meter mechanism the flux return path structure RR is comprised of the yoke component identified generally by the reference character 200 and the pole piece component identified generally by the reference character 300. The pole piece 300 is removably attached to the yoke 200 to form the complete and unitary flux return path structure RR. The yoke 200 includes the substantially solid and unbroken front wall 201 which, in accordance with this form of the invention, also provides the front cover for the mechanism, thus eliminating the necessity for the forwardly projecting, separate cover 70 such as required in the form of the mechanism of FIG. 1. The opposite side wall forming plate members 202 and 203 extend from and along the opposite ends or side edges of the front wall 201. These side wall plates 202 and 203 extend in parallelism at one side of front wall 201 in planes generally normal to the plane of the front wall. By thus eliminating the necessity for a separate front cover through the design and construction which provides the front wall 201 as such front cover, it becomes possible to increase the length of the side walls 202 and 203, or rather to increase the length of the space within such walls from the front wall 201 to the pole piece 300 constituting the rear end wall of the structure RR to thus make possible the mounting of a magnet, such as the magnet CM1, within this space of greater length than would be otherwise possible if using the construction and arrangement of the form of the meter mechanism of FIG. 1.

The pole piece 300 is detachably mounted and fixed on the yoke section or member 200 by providing the cutouts or slots 81 in the opposite ends of the pole piece 300 which receive tongues or lugs 82 extending rearwardly from the rear ends of the side walls 202 and 203 of the yoke member 200. The pole piece 300 is thus mounted and positioned on and across the ends of the side walls 202 and 203 of the yoke member 200 and with the yoke member encloses a space which receives and within which the permanent core magnet CM1 is mounted and fixed. This pole piece 300 is formed as an arcuate or curved plate member and in mounted position on the yoke member has the convex side thereof extending outwardly, as will be clear by reference to the drawings. The width of the side wall plates 202 and 203, the front wall 201, and the opposite pole piece 300 constituting the return path structure RR, is substantially the same as the width of the magnet CM1 at the sides thereof opposite and surrounded by such structure RR.

The core magnet CM1 and the flux return path structure RR are assembled in magnetic connection and association with the magnet CM1 mounted and located within and surrounded by the return path structure in such a manner as to form the air gap GG between the adjacent, in this instance N pole, end of the magnet and the adjacently located pole piece 300 of the return path structure. The magnet CM1 is mounted within the structure RR with the planar surface 111 at the S pole end of the magnet seated on and engaged against the flat, planar surface at the inner side of the front wall 201 of the yoke member. The magnet may be mounted and secured in fixed position within the structure RR in any suitable manner, such for example, as by screw members 83 threaded through suitably aligned transverse bores 83a in the opposite side walls 202 and 203 of the structure RR. The air gap GG is provided within and between the curved or arcuate surface 112 of the N pole end of the magnet and the facing, inner convex side of the pole piece 300 of the return flow structure RR. The radius of curvature on which the pole piece 300 is formed is greater than the radius of curvature on which the arcuate surface 112 of the magnet is formed, both curvatures having the same center point. Thus the air gap GG is of arcuate shape along and between the N pole end of magnet CM1 and the pole piece 300 with the air gap being of constant width throughout its width across and its length between magnet CM1 and the pole piece 300. The return path structure RR may be formed of any suitable permeable material, such for example as soft iron. Thus the combination of the magnet CM1 and return path structure RR develops in the air gap GG a flux concentration or magnetic field.

Following the principles of my invention, as hereinbefore described and explained, I provide in the form of meter mechanism of FIGS. 3 through 5, a moving coil system as exemplified in the form of meter mechanism of FIGS. 1 and 2. Such a system in the form of FIGS. 3 through 5, is comprised solely by the moving coil CC. This coil CC receives therethrough the pole piece component 300. The opening through the coil CC has a width and length greater than the thickness and width of the pole piece 300 so that the pole piece 300 may be received therein and extending therethrough with substantial clearance completely therearound in all locations of the coil in the air gap GG. The coil CC is thus mounted on and over pole piece 300 and is swingable or movable thereover and therealong with the pivoted frame FF without contact or engagement between the coil and the pole piece. Thus mounted, the longitudinal side 144 of coil CC is located in and extends through the air gap GG between the N pole end of magnet CM1 and the inner surface or side of the pole piece 300, while the opposite, longitudinal side 145 of the coil is located and positioned across and over the outer, convex side of pole piece 300.

The coil CC is mounted and carried by a lightweight frame structure comprised of the spaced upper and lower, parallel arms 151 and 152 which extend over and across and which are spaced outwardly from the opposite sides 116 and 117 of the core magnet CM1 with the forward free ends of these frame arms extending over and across the air gap GG and having connected therebetween the coil CC so that the coil is thus secured between and carried by these frame arms for swinging therewith as a unit structure. With the construction and arrangement of the flux return flow path structure RR by which the front end wall 201 thereof is, in effect, moved forwardly into the position occupied by the support brackets 56 of the form of the invention of FIG. 1, the form of the meter mechanism of the example of FIGS. 3 through 5 provides as a further feature thereof a novel mounting and arrangement of pivot means for the coil CC and its supporting frame FF.

The moving coil frame FF has the pivot shaft 153 mounted and secured between the forward spaced ends of the frame arms 151 and 152. The opposite, upper and lower ends of the shaft 153 are provided with the axially aligned upper and lower pivot pins 154 and 155 mounted in the pivot pin bases 154a and 155a extending outwardly from and in axial continuation of the shaft 153 at the outer sides of the frame arms 151 and 152, respectively. Spiral torque springs 156 and 157 are mounted on and concentric with the pivot bases 154a and 155a, respectively. A conducting lug 158 is mounted on each pivot base 154a and 155a and each conducting lug extends radially from its base in opposite directions with one end thereof fixed to the inner coil of its torque spring 156 or 157 and with the other end thereof connected to a circuit line CL which leads therefrom along the adjacent frame arm 151 or 152 to an end of the coil CC. Thus the circuit lines CL from the conducting lugs 158 to the opposite ends of the coil CC together form an energizing circuit through the coil. The circuit lines are of course connecting to the signal current supply source by suitable supply circuit lines connected in the usual manner to and through the torsion springs 156 and 157, as will be familiar to those skilled in this art.

The assembly made up of the moving coil CC, frame arms 151 and 152, the shaft 153 with its opposite end pivot pins 154 and 155 and the torque springs 156 and 157, provides a moving coil unit for mounting in position for swinging of the coil CC in either direction over and along the pole piece 300 of the flux return path structure RR.

In accordance with a feature of this particular form of the invention, the movable coil assembly is mounted for swinging about the axis of shaft 153 between jewel screws 160 that are carried by bridge assemblies 170 mounted in position and extending across the upper and lower sides of the front wall 201 and the forward ends of the side walls 202 and 203 of the flux return flow path structure RR. The jewel screws 160 carried by the bridge assemblies 170 are axially aligned in the mounted positions thereof and rotatably receive therein the opposite end pivot pins 154 and 155, respectively, of the shaft 153 of the moving coil assembly for swinging of the coil CC of that assembly with the frame arms 151 and 152 and the shaft 153 as a unit.

Each bridge assembly in this instance comprises a base 171 having a central outwardly extending bridge portion 172 which includes the platform 173 in which there is threadedly mounted a jewel screw 160 extending axially through the platform 173. An insulating cover 174 in the form of a ring or annular member is mounted and secured on the outer side of the platform 173 of a bridge assembly 170 with the jewel screw 160 extending axially through the central opening of this insulating cover. A jewel screw lock nut 175 is mounted on and over and receives therethrough the jewel screw 160 and provides a tubular sleeve which extends down over and along the jewel screw to the platform 173. A shoulder washer 176 is mounted on and around the lock nut 175 at the inner end thereof. A regulator 177 is mounted on and around the lock nut 175, being secured at one of its ends 177a in a slot formed in the insulating cover 174 and providing a radially extending operating arm 177b at its opposite end. An insulating washer 178 is mounted in position on and around jewel screw 160 at the outer side of the regulator 177 with a tension washer 179 mounted between the insulating washer 178 and the head of the jewel screw lock nut 175 at the outer end of the latter. Thus each jewel screw 160 is mounted on and carried by a bridge assembly 170 in a manner for precise axial adjustment inwardly or outwardly and for locking in an adjusted position by the jewel screw lock nut 175.

The bridge assemblies 170 are secured in position on and across the forward side of the return path flow structure RR at the upper and lower sides thereof, respectively, by the screws 171a threaded into bores in the forward ends of the side walls 202 and 203 of the flux return path structure RR, as will be clear by reference to FIG. 3. The forward side edge 171b of each bridge assembly 170 is formed on a radius and provides a curved edge surface that corresponds to and lies in the plane of the outwardly or forwardly curved front surface of the forward wall and enclosisng case 201 of the return path flow structure RR of the meter mechanism.

In mounted and assembled positions the bridge assemblies 170 axially align the jewel screws 160 thereof with the groove, slot, or re-entrant portion 80 through the magnet CM1 so that the pivot shaft 153 of the moving coil assembly is located in and extends through such groove with operating clearance between the magnet CM1 and the pivot shaft 153, as will be clear by reference to FIG. 2 of the accompanying drawings.

The spiral torque springs 156 and 157 on the upper and lower pivot pin bases 154a and 155a, respectively, are suitably connected with the bridge assemblies respectively adjacent thereto so as to function in the usual manner to provide restoring forces to return the moving coil CC and its swinging frame mounting to normal, inactive position following deflection thereof by energization of the moving coil.

A cross arm 90 is secured on and along the outer side of the frame arm 151 disposed longitudinally thereof. This cross arm 90 extends forwardly across the framework and at its outer end has attached thereto the pointer 91 which extends forwardly to the usual instrument dial D, this pointer 91 terminating at the instrument dial in the depending indicator needle 92 in the usual manner familiar with this general type of meter instrument. Suitable spaced bumper stops 93 are mounted on the forward side of the front end wall 201 of the yoke 200 with the pointer 91 extending therebetween. These bumper stops 93 are adjustably mounted so that the spacing therebetween may be predetermined and set to thus determine the total angle of deflection possible to the pointer.

The meter mechanism in this form of my invention is completed by a cover unit 400 which fits down over the rear end of the mechanism at the outer side of and in position spaced from the moving coil CC. This cover 400 includes the rear wall 401 which is curved or bowed outwardly to conform to the curvature of the pole piece 300 of the return path flow structure RR and in mounted position is spaced rearwardly from the moving coil CC for operating clearance of the latter. The rear side wall 401 has at opposite sides thereof in intermediate locations the forwardly inset shoulders 402 having suitable bores therethrough for receiving the screws 403 which are threaded into bores 404 in the rear ends of the rearwardly extending tongues 82 which mount the pole piece 300 on the yoke member 200. The cover 400 includes the forwardly extending top wall 405 and the forwardly extending, parallel lower wall 406. The top wall 405 extends forwardly to a location above the rear side of the end wall 201 of the yoke member 200 and terminates in an upwardly extending arcuate flange wall 405a which is positioned around the rear side of the upper bridge assembly 170. The lower or under wall 406 is similar to the upper wall 405 and extends forwardly to and terminates in the downwardly extending arcuate flange wall 406a which extends forwardly to and is positioned around the lower bridge assembly 170. In this particular example of a form of meter mechanism of the invention as shown in FIGS. 3 through 5, the cover unit 400 may be considered to be formed of zinc with the surfaces of the cover suitably treated and coated.

By the arrangement as disclosed in FIGS. 3 through 5, the front wall 201 of the yoke member 200 of the flux return path structure RR has the front or forward surface 201a thereof formed on a radius to extend as a forwardly curved, convex surface. This front wall 201 of the yoke member 200 in addition to its essential function as a part of the magnetic circuit also functions as and provides a front cover for and thus makes possible the increase in the length of the space within the yoke member so that a magnet of increased length and thus increased magnetic strength, such as the magnet CM1, may be accommodated and mounted therein.

With the arrangement of the bridge assemblies 170 of the form of the invention of FIGS. 3–5, which mount the jewel screws 160 as bearings for the moving coil assembly, such bearings instead of being located in positions projecting forwardly outwardly from the yoke member so as to require some form of cover, such as in the form of the invention of FIG. 1, are mounted in locations spaced inwardly of the meter mechanism and clear and to the rear of the front wall 201 of the yoke member 200. In the foregoing manner, by utilizing at least a portion of the space heretofore occupied by forwardly projecting structure at the front side of the yoke member, it is possible to efficiently mount and use a magnet of greater length so as to increase the magnetic strength and develop a greatly augmented torque for the meter mechanism. This arrangement permits the use of such longer magnet with the increased torque for the meter mechanism without so increasing the length of the latter as to prevent its proper and efficient mounting and installation in the space usually available for the mounting and installation of such classes of meter mechanisms, say for example, a meter mechanism of this invention in the form as shown in FIG. 1 of the drawings hereof.

It has been further established from actual tests of meter mechanisms of the form of FIGS. 3 through 5, that a greatly increased torque-to-power ratio and a greatly increased torque-to-weight ratio are obtained, together with effective damping of the meter mechanism. The construction, mounting and arrangement of the jewel bearing mounting bridge assemblies, together with the moving coil and frame assembly rotatably mounted and supported in said jewel bearings by such bridge assemblies, provides a simple and highly efficient construction, with a high over-all precision of performance for an instrument incorporating such a meter mechanism.

The form of the invention of FIGS. 3 through 5 utilizes the moving coil system of the invention as disclosed in the form of meter mechanism of FIGS. 1 and 2, in which a single coil is mounted over the pole piece at the rear end of the flux return path structure with one side of the coil in the air gap and the opposite side of the coil at the outer side of such pole piece and outside of the flux return path structure RR and with the coil swingable about an axis located at the pole end of the permanent core magnet opposite the pole end at which the air gap is located. Thus the increased torque-to-power and torque-to-weight ratios obtained by such system as hereinbefore explained, are obtained in the form of the invention of FIGS. 3 to 5, but are augmented by the increase in magnet length and strength for which the form of FIGS. 3 to 5 provides.

It will also be evident that various changes, modifications, variations, substitutions, eliminations and additions may be resorted to without departing from the broad spirit and scope of my invention; hence, I do not intend or desire to limit my invention in all respects to the exact and specific example embodiments or expressions of the invention, as herein disclosed and described, except as may be required by specific limitation thereto appearing in any of the claims hereto appended.

What I claim is:

1. In an electrical meter mechanism, in combination, a permanent core magnet; a flux return path structure of open frame form surrounding and containing said core magnet therein; said return path structure including a front wall, spaced opposite side walls, and a rear wall each of substantially the depth of said core magnet; said core magnet being mounted in magnetic connection at one pole end thereof to said front wall of said return path structure and at the opposite pole end thereof being spaced from and along the rear wall of said return path structure to form an air gap therebetween; a moving coil system comprised of a movably mounted coil surrounding the rear wall of said return path structure at and along said air gap for movement therein in either direction; bridge assemblies mounted on and across the top and lower sides, respectively, of said return path structure in positions at and over the pole end portion of said core magnet at said front wall of said return path structure; each of said bridge assemblies including a bearing member; a pivot shaft extending between and being pivotally mounted at its opposite ends in said bearing members; a frame structure mounted on said pivot shaft extending radially therefrom over and across said core magnet to said air gap; said coil being mounted on said frame; a cover structure mounted on said return path structure and comprising, a rear cover wall spaced rearwardly from said coil in position over and covering the rear side of the latter and said rear wall of said return path structure, a top cover wall and a lower cover wall extending forwardly from said rear cover wall covering the top and lower sides, respectively, of said return path structure to and forwardly around said bridge assemblies; said bridge assemblies with said top and lower cover walls of said cover structure completing a covering for said top and lower sides of said return path structure; and said front wall of said return path structure positioned between and closing the space between said top cover wall and said lower cover wall and providing a forward wall for and closing said cover structure to form therewith a complete enclosure of said return path structure and said core magnet, pivot shaft, swinging frame and coil positioned therewithin.

2. In the combination of claim 1, an indicating needle assembly connected to an swingable by said pivot shaft extending radially forwardly therefrom; and said front wall of said return path structure being provided with an opening therethrough receiving and through which said needle assembly extends for swinging movements therein.

3. In the combination of claim 1, said rear cover wall and said top and lower cover walls being integral and forming a unitary cover structure; said unitary cover structure being removably mounted on said return path structure for removal by withdrawing said cover structure as a unit rearwardly from said return path structure; and removable fastening means detachably securing said rear cover wall to said rear wall of said return path structure.

References Cited in the file of this patent

UNITED STATES PATENTS

| | | |
|---|---|---|
| 2,798,972 | Booth | July 9, 1957 |
| 2,840,782 | Ammon | June 24, 1958 |
| 2,875,410 | Lamb | Feb. 24, 1959 |
| 2,938,151 | Bowditch | May 24, 1960 |
| 2,980,857 | Langford | Apr. 18, 1961 |